United States Patent [19]

Rosenberg

[11] 4,204,520

[45] May 27, 1980

[54] ROOF COMPRISING ROOFING TILES WITH SOLAR WATER HEATING SYSTEM THEREIN

[76] Inventor: David Rosenberg, 865 Comstock Ave., Los Angeles, Calif. 90024

[21] Appl. No.: 882,784

[22] Filed: Mar. 2, 1978

[51] Int. Cl.² .................................................. F24J 3/02
[52] U.S. Cl. .................................... 126/432; 126/446; 165/485
[58] Field of Search ............... 126/270, 271; 237/1 A; 52/518, 533; D25/80; 165/47, 53, 170, 171, 485

[56] References Cited

U.S. PATENT DOCUMENTS

| | | | |
|---|---|---|---|
| D. 25,531 | 5/1896 | Spurgin | D25/80 |
| D. 26,717 | 3/1897 | Keiser | D25/80 |
| 1,125,113 | 1/1915 | Junkers | 165/171 |
| 4,076,026 | 2/1978 | Copping | 237/1 A |
| 4,083,360 | 4/1978 | Courvoisier et al. | 237/1 A |
| 4,084,365 | 4/1978 | Read | D25/80 X |
| 4,086,913 | 5/1978 | Gavin | 126/271 |
| 4,111,188 | 9/1978 | Murphy, Jr. | 126/271 |

Primary Examiner—James C. Yeung
Assistant Examiner—Larry Jones
Attorney, Agent, or Firm—Harris, Kern, Wallen & Tinsley

[57] ABSTRACT

A roofing tile having upper and lower ends and upper and lower surfaces, a transverse groove of substantially semicircular cross section in the upper surface of the roofing tile adjacent its upper end, and a transverse groove of substantially semicircular cross section in the lower surface of the roofing tile adjacent its lower end. A solar water heating system incorporated in a roof comprising roofing tiles having overlapping portions provided with registering transverse grooves of substantially semicircular cross section facing each other, with thermally conductive tubes in the registering grooves. A roofing tile which is a clay tile containing a thermally conductive material, with at least the exposed portion of the upper surface having a permanent black coating to enhance solar heat absorption.

9 Claims, 3 Drawing Figures

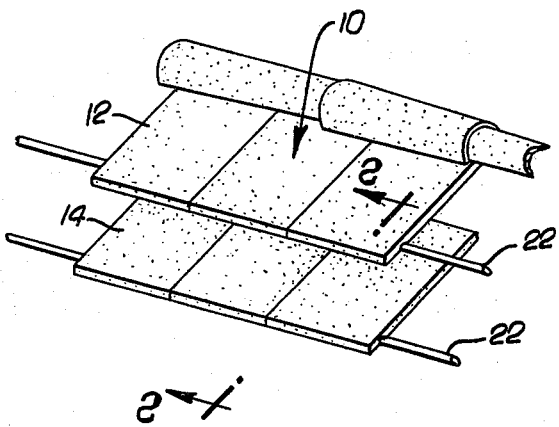
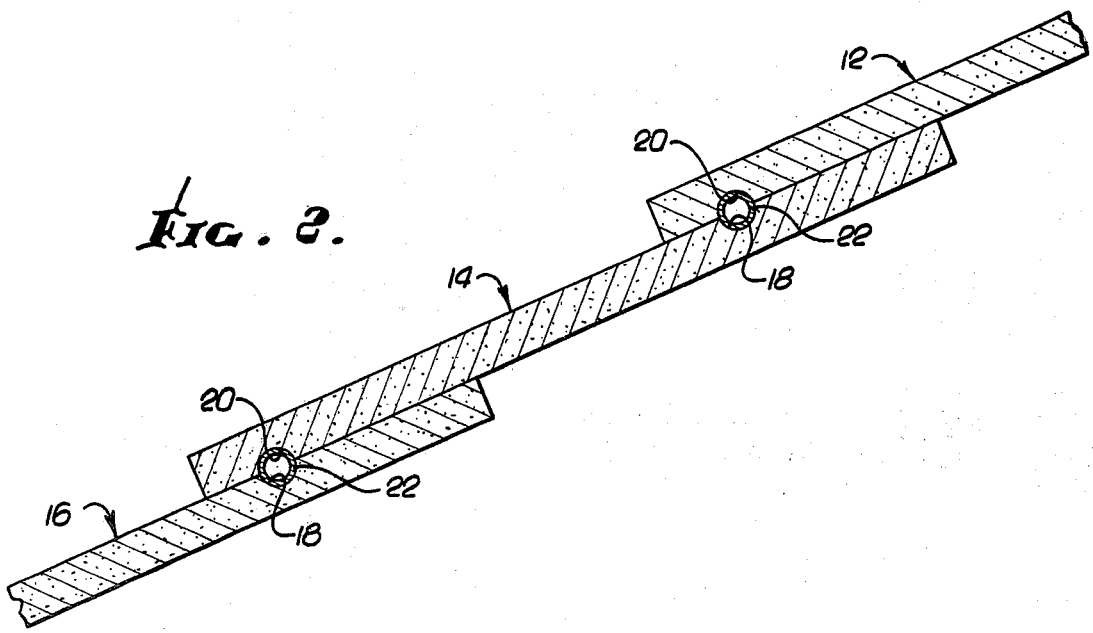
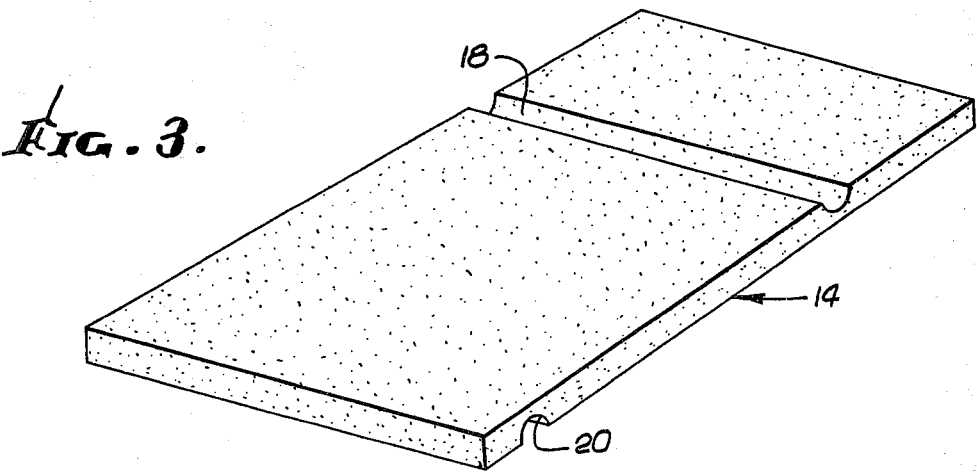

ROOF COMPRISING ROOFING TILES WITH SOLAR WATER HEATING SYSTEM THEREIN

BACKGROUND OF INVENTION

The present invention relates in general to a roofing tile for use in a solar water heating system and, more particularly, to a solar water heating system comprising roofing tiles having thermally conductive tubes therein.

As further background, relevant prior art comprises the following U.S. Pat. Nos.:
3,448,798—Coe
4,024,853—Gordon
4,055,162—Gonzalez Coe is the only patent of any pertinence, and it is relevant only to the extent of showing, in FIGS. 3 and 4, two members 22 and 24 which are provided with matching grooves to receive a tube 21.

SUMMARY AND OBJECTS OF INVENTION

The primary object of the invention is to provide, and the invention may be summarized as comprising, a roof having a solar water heating system therein, with the roof including roofing tiles having overlapping portions and including thermally conductive tubes in registering transverse grooves of substantially semicircular cross section in the overlapping portions of the roofing tiles.

More particularly, an important object is to provide a roofing tile having upper and lower ends and upper and lower surfaces, a transverse groove of substantially semicircular cross section in the upper surface of the roofing tile adjacent its upper end, and a transverse groove of substantially semicircular cross section in the lower surface of the roofing tile adjacent its lower end.

In use, two of the foregoing roofing tiles are arranged in overlapping relation with the transverse groove in the lower surface of the upper tile in register with the transverse groove in the upper surface of the lower tile, and with a thermally conductive tube, preferably metallic, in the registering grooves.

Preferably, the roofing tile of the invention is a clay tile, and an important object is to form the tile of a clay containing a thermally conductive material, such as graphite, metal or metal oxide particles, and the like.

While clay is a presently preferred material, the invention is not limited thereto. For example, the tile may be stamped from metal, such as steel or aluminum, with the transverse tube-receiving grooves referred to above. If desired, such metallic tiles may be coated with porcelain, or the like, for maximum weather resistance. Also, the tiles may be made of plastic, glass, or any other suitable material.

Still another important object is to provide at least the exposed part of the upper surface of each tile with a permanent black coating to maximize solar heat energy absorption.

The tubes incorporated in the tile roof are suitably connected to a source of water to be heated and to a suitable storage tank, or the like, for heated water, which heated water may be utilized for any desired purpose.

As will be apparent, the invention provides a very simple and effective way of utilizing solar heat energy to heat water, without the use of exposed solar heating units, heating tubes, or the like, which are important features.

The foregoing objects, advantages, features and results of the present invention, together with various other objects, advantages, features and results thereof which will be evident to those skilled in the solar water heating art in the light of this disclosure, may be achieved with the exemplary embodiment of the invention illustrated in the accompanying drawing and described in detail hereinafter.

DESCRIPTION OF DRAWING

FIG. 1 is a fragmentary perspective view on a reduced scale showing a tile roof having a solar water heating system of the invention therein;

FIG. 2 is an enlarged, fragmentary sectional view taken as indicated by the arrowed line 2—2 of FIG. 1; and FIG. 3 is a perspective view of a roofing tile embodying the invention.

DETAILED DESCRIPTION OF EXAMPLARY EMBODIMENT OF INVENTION

FIG. 1 shows fragmentarily a tile roof 10 of the invention having a solar water heating system therein, the roof being shown as comprising an upper course of roofing tiles 12 overlapping a lower course of roofing tiles 14. FIG. 2 shows one of the tiles 14 overlapping a tile 16 in a third course.

As best shown in FIG. 3, which illustrates one of the tiles 14, for example, the upper surface of each tile is provided with a transverse groove 18 of substantially semicircular cross section adjacent the upper end of such tile. The lower surface of each tile 14 is provided with a transverse groove 20 of substantially semicircular cross section adjacent the lower end thereof. (For convenience of manufacture, all of the tiles 12, 14 and 16 are preferably identical. However, it will be apparent that the upper groove 18 in each tile 12 can be omitted, and that the lower groove 20 in the tiles of the lowermost course, not shown, can be omitted.)

As will be apparent, the grooves 18 and 20 are formed in overlapping portions of the tiles 12 and 14, for example, and face each other to provide a composite groove of substantially circular cross section to receive a thermally conductive tube 22, preferably metallic, e.g., copper, stainless steel, or the like.

Water to be heated flows through the tubes 22 from one end of the roof 10 to the other, water being supplied from a suitable source, not shown, at one end, and being delivered to a suitable hot water storage tank or the like, not shown, at the other end. If desired, the tubes 22 may be manifolded at their ends.

As will be apparent, the invention provides a solar water heating system which is incorporated in the roof 10 so that it is not visible, which is an important feature of the invention. One possible material for the tiles 12, 14, 16, etc., is clay, in which case the clay of the tiles preferably contains a thermally conductive material, as hereinbefore outlined. Also, to increase the rate of solar heat absorption, at least the exposed portions of the various tiles have permanently black upper surfaces.

While conventional clay tiles, with the grooves 18 and 20 therein, are presently preferred, metallic tiles having similar grooves stamped therein may be used also. Such tiles can be coated with porcelain, or other suitable material, to provide maximum resistance to weather exposure. Also, as previously pointed out, still other materials can be used.

Although an exemplary embodiment of the invention has been disclosed for illustrative purposes, it will be understood that various changes, modifications and substitutions may be incorporated in such embodiment without departing from the invention as hereinafter claimed.

The invention claimed is:

1. A flat roofing tile having upper and lower ends and flat upper and lower surfaces for positioning between corresponding overlying and underlying flat tiles in engagement with the flat lower and upper surfaces thereof, respectively, a transverse groove of substantially semicircular cross section in its upper surface adjacent and spaced from its upper end, and a transverse groove of substantially semicircular cross section in its lower surface adjacent and spaced from its lower end, with said grooves mating with corresponding grooves in said corresponding overlying and underlying tiles whereby the tiles when placed in an over and underlying relationship said mating grooves encircle a fluid conducting heat transfer tube.

2. A roofing tile as defined in claim 1 which is a clay tile.

3. A roofing tile according to claim 2 wherein the clay of which said tile is formed contains a thermally conductive material.

4. A roofing tile as defined in claim 3 wherein at least said upper surface is provided with a permanent black coating.

5. In a roof having a solar water heating system therein, the combination of:
 (a) a plurality of generally rectangular roofing tiles having flat overlapping upper and lower surfaces provided with registering transverse grooves of substantially semicircular cross section in said flat overlapping surfaces, with grooves of overlapping tiles facing each other defining substantially circular passages; and
 (b) thermally conductive tubes in said registering grooves said tubes conducting a heat transfer fluid.

6. A roof as defined in claim 5 wherein said tubes are metallic.

7. A roof according to claim 6 wherein said tiles are clay tiles.

8. A roof as set forth in claim 7 wherein the clay of said tiles contains a thermally conductive material.

9. A roof according to claim 8 wherein said tiles have permanently black exposed upper surfaces.

* * * * *